Dec. 17, 1929.  J. H. PENGILLY ET AL  1,739,913
TESTING DEVICE
Original Filed May 14, 1923.
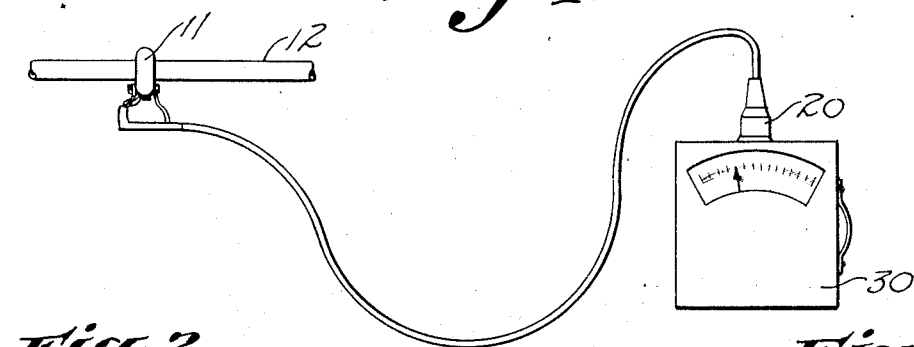
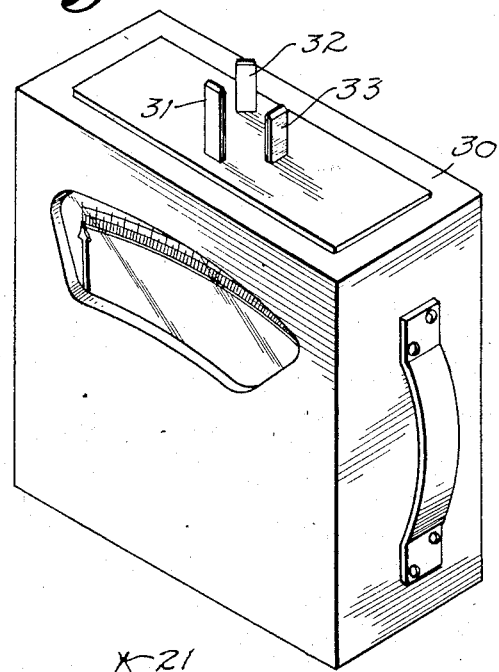
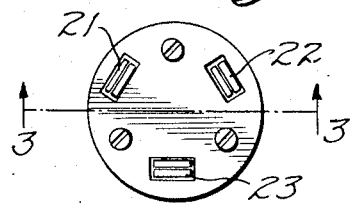
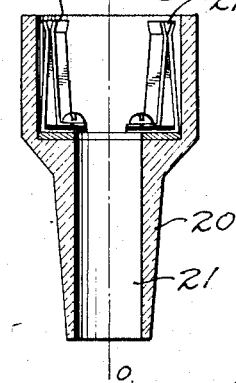
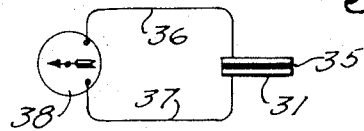
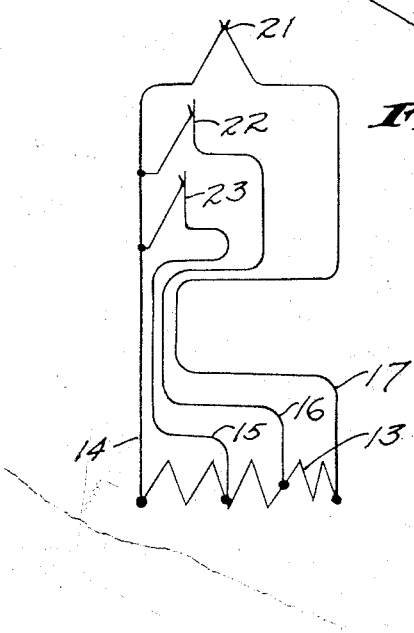
INVENTORS:
JOSEPH H. PENGILLY
VERNON BROWN
BY
Ford W. Harris
ATTORNEY.

Patented Dec. 17, 1929

1,739,913

UNITED STATES PATENT OFFICE

JOSEPH H. PENGILLY AND VERNON BROWN, OF LOS ANGELES, CALIFORNIA, ASSIGNORS TO DIAMOND ELECTRICAL MANUFACTURING COMPANY, INC., OF LOS ANGELES, CALIFORNIA, A CORPORATION OF DELAWARE

TESTING DEVICE

Original application filed May 14, 1923, Serial No. 638,825. Divided and this application filed January 17, 1928. Serial No. 247,281.

This case is a division of our application Serial No. 638,825, filed May 14, 1923, for Plugging device.

Our invention relates to the art of electrical measurement, and is particuarly applicable to the measurement of electric currents in alternate current circuits, and particularly in circuits carrying several hundred amperes. It is common practice to use a series transformer for the purpose of reducing the current passing through the ammeter windings. It is further common practice to employ testing sets in which the iron carrying the magnetic lines is split to allow it to be clasped around the cable carrying the current to be measured. The secondary winding of the transformer, consisting of a considerable number of turns of fine, insulated wire, is wound around the iron above referred to. The cable carrying the current then acts as a primary winding, causing the magnetic flux to flow in the iron, this flux generating a smaller current in the fine, secondary winding.

Inasmuch as the device must be applied to cables carrying various intensities of current, it is desirable to have an arrangement by means of which the active turns of the secondary winding can be varied. In other words, it is desirable to be able to use all or a part of the secondary turns for the purpose of varying the ratio between the current flowing in the ammeter from the secondary winding and the current flowing in the cable to be measured.

It is therefore an object of our invention to provide a testing device of the character above described in which a varying number of turns of the secondary may be connected with the meter of the device.

It is quite essential that the secondary windings of a series transformer be always kept closed upon itself, as otherwise excessive potentials re induced therein, these potentials being sometimes dangerous to the persons handling the transformer, and in all cases being quite destructive to the insulation.

It is a further object of our invention to provide a testing device of the character above described in which the various secondary circuits of the device are normally closed to prevent building up high voltages in these circuits.

While it is highly desirable that the various circuits be normally closed, when any circuit is connected up to the meter all others of the circuits having turns of the secondary which are also included in the circuit connected to the meter must be opened for the device to operate.

It is a still further object of our invention to provide a testing device in which normally closed secondary circuits, having turns of the secondary also included in a secondary circuit which is connected to the meter, are opened substantially as the last mentioned circuit and the meter are connected.

Another object of our invention is to provide a testing device as above described in which the opening of secondary circuits other than that which is connected to the meter is accomplished automatically regardless of which of said circuits is connected to said meter.

It is yet another object of our invention to provide a testing device as above described in which the opening of secondary circuits other than that which is connected to said meter is accomplished slightly following said connection regardless of which of said circuits is connected to said meter.

It is a further object of our invention to provide a simple, practical and cheap construction for accomplishing the above objects.

Further objects and advantages will be made evident hereinafter.

Referring to the drawing, which is for illustrative purposes only:

Fig. 1 is a view of a complete testing outfit embodying our invention.

Fig. 2 is a perspective view of the ammeter.

Fig. 3 is a section through a plug, taken on a plane represented by the line 3—3 of Fig. 4.

Fig. 4 is an end view of the plug.

Fig. 5 is a diagram of connections of the series transformer and fingers; and

Fig. 6 is a diagram of connection of the ammeter.

In the form of the invention illustrated, 11 is a series transformer, which may be of any conventional form, but which is preferably constructed that it can be used in connection with a cable 12. The series transformer is provided with a secondary winding, indicated on the diagram, Fig. 5 at 13, this winding being connected through flexible leads 14, 15, 16, and 17 with a suitable plug. This plug consists of a primary insulating support 20, having an opening 21 through which the flexible leads 14, 15, 16, and 17 may pass, and carrying three pairs of fingers 21, 22, and 23. These fingers are arranged about the axis o—o of the plug, and are at an angular distance of 120° from each other. One of the fingers of each of the pairs 21, 22, and 23 is connected to the common lead 14; the other finger of the pair 21 is connected to the lead 17; the other finger of the pair 22 being connected to the lead 16; and the other finger of the pair 23 being connected to the lead 15. Referring to the diagram Fig. 5, it will be noted that the fingers 22 bridge more turns of the secondary winding than the fingers 23, and that the fingers 21 bridge the entire winding.

Mounted on the ammeter 30 are three members 31, 32 and 33. These members each consist of two flat copper plates, separated by insulation 35. The member 31 is connected through wires 36 and 37 on the inside of the ammeter case 30 to the windings 38 of the ammeter. The member 31 is considerably longer than the members 32 and 33; and the members 31, 32, and 33 are so placed that they readily pass between the pairs of fingers 21, 22, and 23 carried on the primary insulating support 20. Members 31, 32, and 33 are so arranged that the member 31 which is hereinafter called the active member, can be inserted between any of the pairs of fingers 21, 22, and 23, in which event the members 32 and 33 thereafter pass between the other fingers.

The method of operation is as follows:
The primary insulating support 20 being turned into such a position about its axis o—o that the member 31 engages the desired fingers, for example the fingers 22, the support is then forced along its axis o—o until the member 31 passes between the members 22, thus separating the fingers 22 and simultaneously connecting the wires 36 and 37 to the two fingers 22 respectively. This connects the ammeter winding 38 in series with the fingers 22 and in series with the leads 14 and 16, the secondary turns between the leads 14 and 16 being thus connected in series with the ammeter winding. As the insulating support 20 is moved further along the axis o—o, the members 32 and 33 separate the fingers 21 and 23, breaking the electrical contact therebetween, the fingers being thereafter insulated from each other. This then disconnects the leads 15 and 17, so that only the secondary turns of the series transformer between the leads 14 and 16 are in circuit. Whenever it is desired to disconnect the ammeter, the support 20 is pulled away from the ammeter, thus first connecting the fingers 21 and 23 together and thereafter connecting the fingers 22 and breaking the circuit to the ammeter winding. It is evident that with the three sets of fingers and three sets of operating members, we can obtain three different ratios of transformation. Obviously, more than three sets of fingers and cooperating members may be used, thus giving additional transformer space.

We claim as our invention:

1. In combination: a transformer secondary winding; a plurality of pairs of contacts, the contacts of each pair being normally in engagement with each other; means for connecting said pairs of contacts with said transformer secondary winding so that each pair of contacts bridge a different amount thereof; a meter; an active member operatively connected to said meter; and an inactive member supported adjacent to said active member, said active and inactive members being arranged to separate said pairs of contacts, the pair of contacts engaged by said active member being separated first.

2. In combination: a transformer secondary winding; means for setting up a plurality of closed circuits including different portions of said winding; a meter; and means adapted in a single operation to interpose said meter in one of said closed circuits and thereafter in the same operation to open other of said circuits.

3. In combination: a transformer secondary winding; means for setting up a plurality of closed circuits including different portions of said winding; a meter; and means adapted in a single operation to interpose said meter in any desired one of said closed circuits and thereafter in the same operation to open other of said circuits.

4. In combination: a transformer secondary winding; means forming a plurality of circuits including different portions of said winding; switch means in said circuits normally maintaining said circuits closed; a meter; and means adapted to engage said switch means to interpose said meter in a given one of said circuits, and to automatically open other of said circuits.

5. In combination: a transformer secondary winding; means forming a plurality of circuits including different portions of said winding; switch means in said circuits normally maintaining said circuits closed; a meter; and means adapted to engage said switch means to interpose said meter in any desired one of said circuits, and to automatically open other of said circuits.

6. In combination: a transformer secondary winding; means forming a plurality of circuits including different portions of said winding; switch means in said circuits normally maintaining said circuits closed; a meter; and means adapted to engage said switch means to interpose said meter in any desired one of said circuits, and to automatically open other of said circuits, the opening of said other circuits being accomplished after the interposing of said meter in said desired circuit.

In testimony whereof, we have hereunto set our hands at Los Angeles, California, this 11th day of January, 1928.

JOSEPH H. PENGILLY.
VERNON BROWN.